United States Patent
Cai et al.

(10) Patent No.: US 10,447,509 B1
(45) Date of Patent: Oct. 15, 2019

(54) PRECOMPENSATOR-BASED QUANTIZATION FOR CLOCK RECOVERY

(71) Applicant: Credo Technology Group Limited, Grand Cayman (KY)

(72) Inventors: Fang Cai, Milpitas, CA (US); Junqing Sun, Fremont, CA (US); Haoli Qian, Fremont, CA (US)

(73) Assignee: Credo Technology Group Limited (KY)

( * ) Notice: Subject to any disclaimer, the term of this patent is extended or adjusted under 35 U.S.C. 154(b) by 0 days.

(21) Appl. No.: 16/110,594

(22) Filed: Aug. 23, 2018

(51) Int. Cl.
*H04L 25/03* (2006.01)
*H04B 14/02* (2006.01)
*H04L 27/01* (2006.01)

(52) U.S. Cl.
CPC ..... *H04L 25/03057* (2013.01); *H04B 14/023* (2013.01); *H04L 27/01* (2013.01)

(58) Field of Classification Search
CPC .............. H04L 25/03057; H04L 27/01; H04L 2025/0349; H04L 2025/0361; H04L 2025/03503; H04L 25/03038; H04B 14/023
See application file for complete search history.

(56) References Cited

U.S. PATENT DOCUMENTS

| | | |
|---|---|---|
| 8,301,036 B2 | 10/2012 | He |
| 9,071,479 B2 | 6/2015 | Qian et al. |
| 9,935,800 B1 | 4/2018 | He |
| 2014/0270030 A1* | 9/2014 | Hammad ............ H04L 7/0079 375/371 |

OTHER PUBLICATIONS

Mueller, Kurt H., et al.; Timing Recovery in Digital Synchronous Data Receivers; IEEE Transactions on Communications; May 1976; vol. COM-24; No. 5.

Musa, Faisal A.; Thesis: High-Speed Baud-Rate Clock Recovery; University of Toronto; 2008.

\* cited by examiner

*Primary Examiner* — Ted M Wang
(74) *Attorney, Agent, or Firm* — Ramey and Schwaller, LLP; Daniel J. Krueger

(57) ABSTRACT

Precompensator-based quantization techniques offer a way to reduce the complexity and power requirements of clock recovery modules while offering improved timing recovery performance relative to a bang-bang scheme operating in a lossy channel. One illustrative method embodiment includes: (a) obtaining a receive signal having a sequence of symbols from a symbol set, the receive signal exhibiting trailing intersymbol interference; (b) operating on the receive signal with a precompensation unit having a set of comparators to produce, for each sampling instant, a set of comparator results representing a quantized receive signal value, the set of comparators applying a set of threshold values that at least partly compensate for the trailing intersymbol interference; (c) deriving a symbol decision from each set of comparator results; (d) combining the symbol decisions with said quantized receive signal values to determine an estimated timing error for each sampling instant; and (e) filtering the estimated timing errors to generate a sampling clock.

21 Claims, 6 Drawing Sheets

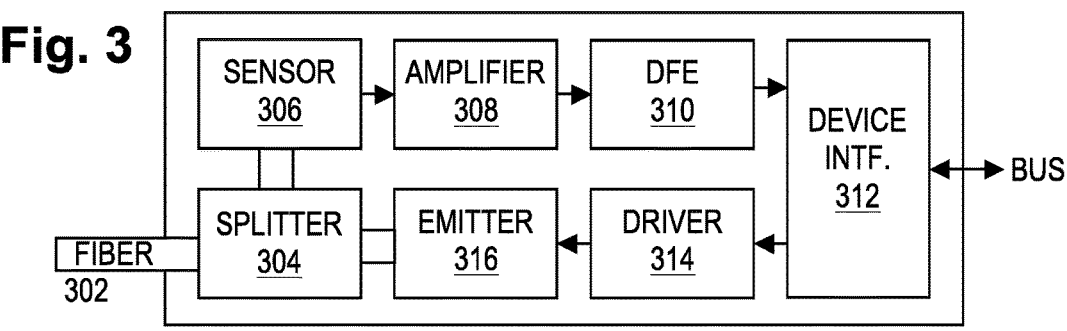
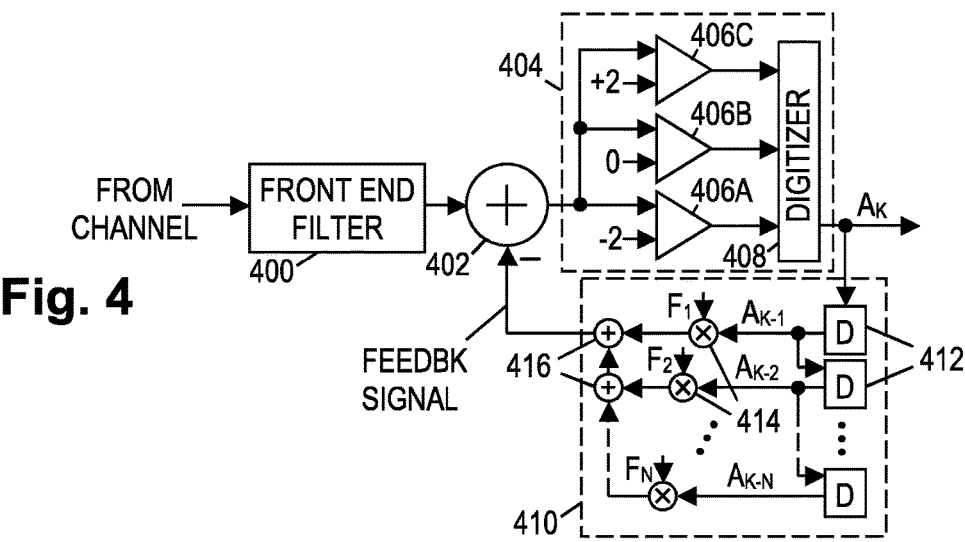

US 10,447,509 B1

PRECOMPENSATOR-BASED QUANTIZATION FOR CLOCK RECOVERY

BACKGROUND

Digital communications occur between sending and receiving devices over an intermediate communications medium, or "channel" (e.g., a fiber optic cable or insulated copper wires). Each sending device typically transmits symbols at a fixed symbol rate, while each receiving device detects a (potentially corrupted) sequence of symbols and attempts to reconstruct the transmitted data. A "symbol" is a state or significant condition of the channel that persists for a fixed period of time, called a "symbol interval." A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by sequences of two or more symbols.

Many digital communication links use only one bit per symbol; a binary '0' is represented by one symbol (e.g., an electrical voltage or current signal within a first range), and binary '1' by another symbol (e.g., an electrical voltage or current signal within a second range), but higher-order signal constellations are known and frequently used. In 4-level pulse amplitude modulation (PAM4), each symbol interval may carry any one of four symbols, typically denoted as −3, −1, +1, and +3. Each PAM4 symbol can thus represent two binary bits.

Channel non-idealities produce dispersion often causing each symbol to perturb its neighboring symbols, an effect known as inter-symbol interference (151). ISI can make it difficult for the receiving device to determine which symbols were sent in each interval, particularly when such ISI is combined with additive noise.

To combat noise and ISI, receiving devices may employ various equalization techniques. Linear equalizers generally have to balance between reducing ISI and avoiding noise amplification. Decision Feedback Equalizers (DFE) are often preferred for their ability to combat ISI without inherently requiring noise amplification. As the name suggests, a DFE employs a feedback path to remove ISI effects derived from previously-decided symbols.

A standard textbook implementation of a DFE employs a number of cascaded circuit elements to generate the feedback signal and apply it to the received input signal, all of which must complete their operation in less than one symbol interval. At a symbol interval of 100 picoseconds (for a symbol rate of 10 gigabaud), this implementation is very challenging with currently available silicon semiconductor processing technologies. Even data rates around a few gigabaud per second can be difficult to achieve due to performance limitations of silicon-based integrated circuits.

Accordingly, certain proposed designs such as those disclosed in U.S. Pat. No. 8,301,036 ("High-speed adaptive decision feedback equalizer"), U.S. Pat. No. 9,071,479 ("High-speed parallel decision feedback equalizer"), and U.S. Pat. No. 9,935,800 ("Reduced Complexity Precomputation for Decision Feedback Equalizer"), employ alternative implementations that exploit the use of precompensation modules. Each of these references is hereby incorporated herein by reference in their entireties. However, as symbol rates continue to increase, the ISI worsens, challenging even the performance of these proposed equalizers. One issue in particular is clock-signal recovery. While high-performance clock recovery modules are known, they are complex and would consume an inordinate amount of power at the sampling rates contemplated herein.

SUMMARY

Accordingly, there are disclosed herein precompensator-based quantization techniques for reducing the complexity and power requirements of clock recovery modules, as well as equalizers, devices, and systems employing such techniques. One illustrative method embodiment includes: (a) obtaining a receive signal having a sequence of symbols from a symbol set, the receive signal exhibiting trailing intersymbol interference; (b) operating on the receive signal with a precompensation unit having a set of comparators to produce, for each sampling instant, a set of comparator results representing a quantized receive signal value, the set of comparators applying a set of threshold values that at least partly compensate for the trailing intersymbol interference; (c) deriving a symbol decision from each set of comparator results; (d) combining the symbol decisions with said quantized receive signal values to determine an estimated timing error for each sampling instant; and (e) filtering the estimated timing errors to generate a sampling clock.

An illustrative receiver includes a front end filter that produces a filtered receive signal having a sequence of symbols from a symbol set, the sequence having trailing intersymbol interference. The receiver further includes a precompensation unit that operates on the filtered receive signal with a set of comparators, applying a set of threshold values that at least partly compensate for the trailing intersymbol interference to produce, for each sampling instant, a set of comparator results representing a quantized receive signal value. The receiver also includes one or more selection elements that derive a symbol decision from each set of comparator results; and a clock recovery module that combines the symbol decisions with said quantized receive signal values to generate a sampling clock.

Each of the foregoing embodiments may be implemented alone or together with any one or more of the following optional features in any suitable combination: 1. said deriving includes using the comparator results to form a set of tentative decisions for each sampling instant and, based on one or more symbol decisions preceding that sampling instant, selecting a symbol decision from the set of tentative decisions. 2. the set of threshold values is nonuniformly spaced and yields a nonuniformly spaced set of possible values for the quantized receive signal. 3. the set of possible values includes values midway between each pair of neighboring threshold values, and further includes a maximum value greater than the maximum threshold value by a given amount and a minimum value less than the minimum threshold value by the given amount. 4. the given amount minimizes expected quantization error. 5. adapting the threshold values based to improve compensation of the trailing intersymbol interference. 6. the symbol set includes more than two symbols. 7. said combining includes: (d1) scaling a quantized receive signal value for a given sampling instant by a polarity or signed value of a symbol decision for a preceding sampling instant to obtain a first term; (d2) scaling a quantized receive signal value for the preceding sampling instant by a polarity or signed value of a symbol decision for the given sampling instant to obtain a second term; and (d3) taking a difference between the first and second terms as the estimated timing error for the given sampling instant. 8. the combining includes: (d1') determining a target signal level for a given sampling instant based at least in part on a symbol decision for the given instant; and (d2') taking a difference between the target signal level and a quantized receive signal value for the given sampling instant to obtain a discrepancy for the given instant. 9. the combining further includes: (d3') scaling the discrepancy for the given sampling instant by a polarity or signed value of a symbol decision for a preceding sampling instant to obtain a first term; (d4') scaling a discrepancy for the preceding sampling instant by a polarity or signed value of a symbol decision for the given sampling instant to obtain a second term; and (d5') taking a difference between the first and second terms as the estimated timing error for the given sampling instant. 10. each of the one or more selection elements selects a symbol decision from a corresponding set of tentative decisions. 11. adaptation units that adapt the threshold values based to improve compensation of the trailing intersymbol interference. 12. said clock recovery module includes: a first scaler that scales a quantized receive signal value for a given sampling instant by a polarity or signed value of a symbol decision for a preceding sampling instant to obtain a first term; a second scaler that scales a quantized receive signal value for the preceding sampling instant by a polarity or signed value of a symbol decision for the given sampling instant to obtain a second term; and a combiner that determines a difference between the first and second terms and produces the difference as the estimated timing error for the given sampling instant. 13. said clock recovery module includes: a targeting element that produces a target signal level for a given sampling instant based at least in part on a symbol decision for the given instant; and a first combiner that takes a difference between the target signal level and a quantized receive signal value for the given sampling instant to obtain a discrepancy for the given instant. 14. the clock recovery module includes: a first scaler that scales the discrepancy for the given sampling instant by a polarity or signed value of a symbol decision for a preceding sampling instant to obtain a first term; a second scaler that scales the discrepancy for the preceding sampling instant by a polarity or signed value of a symbol decision for the given sampling instant to obtain a second term; and a second combiner that determines a difference between the first and second terms and produces the difference as the estimated timing error for the given sampling instant. 15. the clock recovery module includes a filter that filters the estimated timing errors to produce a control signal. 16. The clock recovery module includes a voltage controlled oscillator that produces the sampling clock in response to the control signal.

Note that the disclosure is not limited to the specific embodiments recited here, described below, and/or shown in the drawings. Rather, the disclosure extends also to the alternative forms, equivalents, and modifications that one of ordinary skill would discern in view of the state of the art on the filing date hereof, including all those that are encompassed within the scope of the appended claims.

BRIEF DESCRIPTION OF THE DRAWINGS

FIG. 3 is a block diagram of an illustrative fiber optic interface module.

FIG. 4 is a block diagram of an illustrative textbook decision feedback equalizer (DFE) implementation.

DETAILED DESCRIPTION

Figure 1:
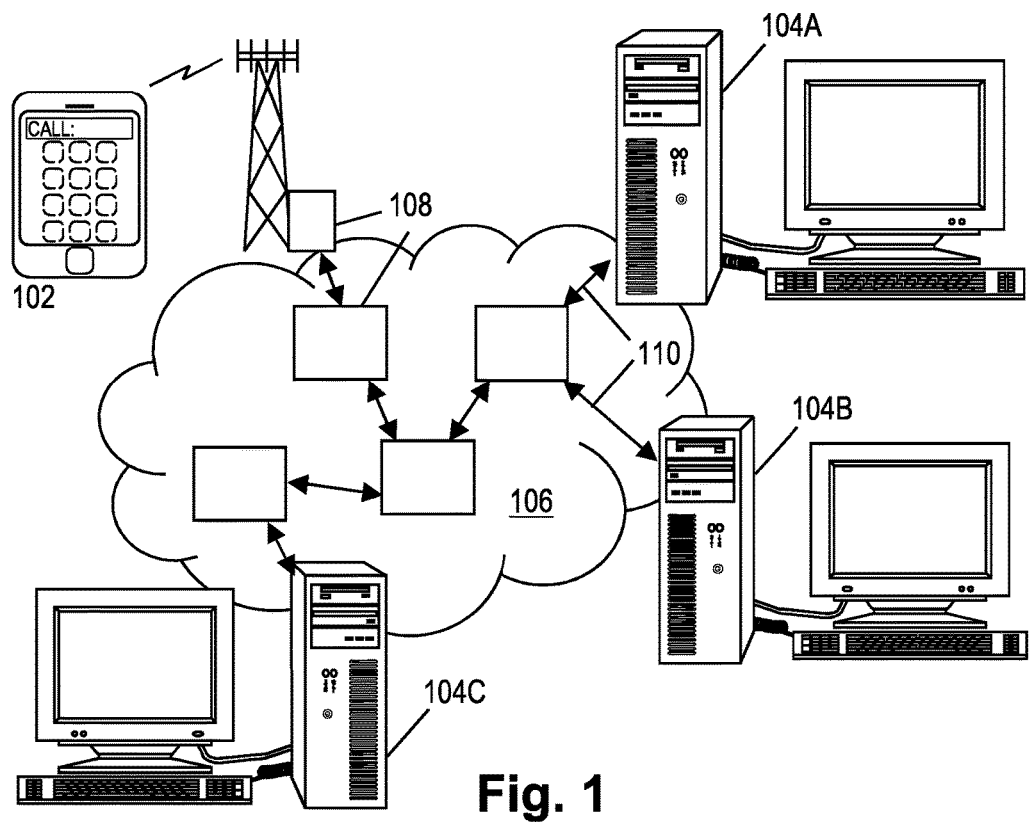
FIG. 1 shows an illustrative computer network.

The disclosed apparatus and methods are best understood in the context of the larger environments in which they operate. Accordingly, FIG. 1 shows an illustrative communications network 100 including wireless mobile devices 102 and computer systems 104A-C coupled via a routing network 106. The routing network 106 may be or include, for example, the Internet, a wide area network, a local area network, a telephone network, or a cable network. In FIG. 1, the routing network 106 includes a network of equipment items 108, such as switches, routers, wireless access points, and the like. At least some of the equipment items 108 are connected to one another, and to the computer systems 104A-C, via point-to-point communication links 110 that transport data between the various network components.

Figure 2:
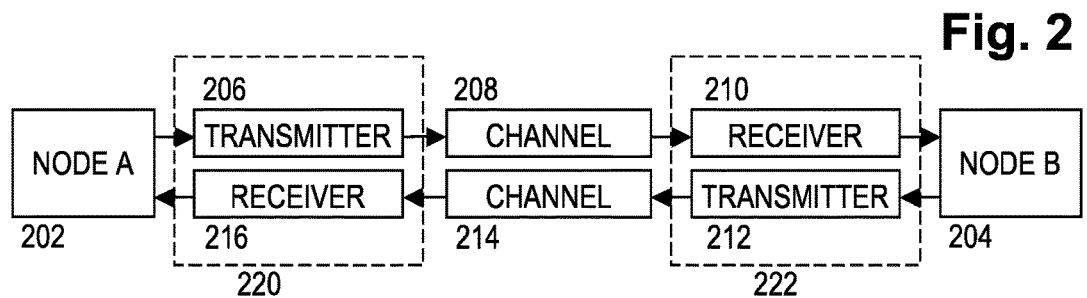
FIG. 2 is a block diagram of an illustrative point-to-point communication link.

FIG. 2 is a diagram of an illustrative point-to-point communication link that may be representative of links 110 in FIG. 1. The illustrated embodiment includes a first node 202 ("Node A") in communication with a second node 204 ("Node B"). Nodes A & B can each be, for example, any one of mobile devices 102, equipment items 108, computer systems 104A-C, or other sending/receiving devices suitable for high-rate digital data communications.

Coupled to Node A is a transceiver 220, and coupled to Node B is a transceiver 222. Communication channels 208 and 214 extend between the transceivers 220 and 222. The channels 208 and 214 may include, for example, transmission media such as fiber optic cables, twisted pair wires, coaxial cables, backplane transmission lines, and wireless communication links. (It is also possible for the channel to be a magnetic or optical information storage medium, with the write-read transducers serving as transmitters and receivers.) Bidirectional communication between Node A and Node B can be provided using separate channels 208 and 214, or in some embodiments, a single channel that transports signals in opposing directions without interference.

A transmitter 206 of the transceiver 220 receives data from Node A and transmits the data to the transceiver 222 via a signal on the channel 208. The channel signal may be, for example, an electrical voltage, an electrical current, an optical power level, a wavelength, a frequency, or a phase value. A receiver 210 of the transceiver 222 receives the signal via the channel 208, uses the signal to reconstruct the transmitted data, and provides the data to Node B. Similarly, a transmitter 212 of the transceiver 222 receives data from Node B, and transmits the data to the transceiver 220 via a signal on the channel 214. A receiver 216 of the transceiver 220 receives the signal via the channel 214, uses the signal to reconstruct the transmitted data, and provides the data to Node A. Though the present disclosure is applicable to systems for both wired and wireless communications, optical signaling is discussed in detail below as a specific example to aid understanding. Examples specific to copper wire signaling and wireless radio, microwave, or infrared signaling are also contemplated and will be evident to those of ordinary skill having benefit of the present disclosure.

FIG. 3 illustrates a transceiver embodiment specific to fiber optic signaling with a function block diagram of an illustrative fiber optic interface module. The optical fiber 302 couples to a splitter 304 which creates two optical paths to the fiber: one for receiving and one for transmitting. A sensor 306 is positioned on the receiving path to convert one or more received optical signals into corresponding analog (electrical) receive signals that are amplified by amplifier 308 in preparation for processing by a decision feedback equalizer (DFE) 310. The DFE 310 converts the received signal into a sequence of symbol decisions. A device interface 312 buffers the sequence of symbol decisions and, in at least some embodiments, includes forward error correction (FEC) decoding and payload extraction logic to derive a received data stream from the sequence of symbol decisions. The device interface 312 then makes the received data stream available to the host node via an internal data bus in accordance with a standard I/O bus protocol.

Conversely, data for transmission can be communicated by the host node via the bus to device interface 312. In at least some embodiments, the device interface 312 packetizes the data with appropriate headers and end-of-frame markers, optionally adding a layer of FEC coding and/or a checksum. Driver 314 accepts a transmit data stream from interface 312 and converts the transmit data stream into an analog electrical drive signal for emitter 316, causing the emitter to generate optical channel signals that are coupled via splitter 304 to the optical fiber 302.

As previously mentioned, a DFE is included in the receive chain to combat intersymbol interference (ISI) that results from signal dispersion in the channel. FIG. 4 shows an illustrative "textbook" implementation of a DFE. In FIG. 4, an analog or digital front end filter 400 operates on the receive signal to shape the overall channel response of the system and minimize the effects of leading ISI on the current symbol. As part of the shaping of the overall channel response, the front end filter 400 may also be designed to shorten the channel response of the filtered signal and, in some cases, reduce a number of precompensation module comparator thresholds, while minimizing any attendant noise enhancement. A summer 402 subtracts a feedback signal from the output of the front end filter 400 to minimize the effects of trailing ISI on the current symbol.

A decision element 404 then digitizes (i.e., samples if necessary and quantizes) the combined signal to produce a stream of output data symbols (denoted $A_k$, where k is the time index). If the signal sampling has not been done previously (e.g., to implement a the front end filter digitally), it may be performed, e.g., at the input to the decision element 404, at the output of comparators 406A-406C, or at the output of the decision element 404. A "sample and hold" circuit captures the level of the analog signal at a sampling instant and provides an analog output signal that is maintained at that level until a signal level capture is needed for the next sampling instant. In the illustrated example, the symbols are presumed to be PAM4 (−3, −1, +1, +3), making the decision thresholds −2, 0, and +2 for comparators 406A-406C, respectively, but bipolar signaling (−1, +1) and higher-order PAM signaling embodiments are also contemplated. (The unit for expressing symbol and threshold values is omitted for generality, but for explanatory purposes may be presumed to be volts. In practice, a scale factor will be employed.) A digitizer 408 is generally included to convert the comparator outputs into a binary number representation, e.g., 00 to represent −3, 01 to represent −1, 10 to represent +1, and 11 to represent +3. Alternatively, the digitizer may employ a Gray-coded representation.

In connection with certain embodiments contemplated herein, we note that the outputs of the comparators 406A-406C may be recognized as (and employed as) a "thermometer"-coded representation of the symbol, e.g., 000 to represent −3, 100 to represent −1, 110 to represent +1, and 111 to represent +3. In this case digitizer 408 may be omitted.

The DFE generates the feedback signal with a feedback filter 410 having a series of delay elements 412 (e.g., latches, flip flops, or registers) that store the recent output symbol decisions ($A_{k-1}$ ... $A_{k-N}$, where N is the number of filter coefficients $f_i$). A set of multipliers 414 determines the product of each symbol with a corresponding filter coefficient, and a series of summers 416 combines the products to obtain the feedback signal. A different filter coefficient '$F_X$' is provided to each of the multipliers 414, where X=1, 2, ..., N. Each filter coefficient '$F_X$' is an analog voltage value. Each of the multipliers 414 produces an output voltage that is a product of the input previous output voltage level and the input filter coefficient. Each of the multipliers 414 may be or include, for example, an adjustable resistance network having a resistance value dependent upon the input filter coefficient, or an amplifier having a voltage gain dependent upon the input filter coefficient.

As an aside, we note here that while the circuitry for the front end filter 400 and the feedback filter 410 is described as operating on analog signals, they can alternatively be implemented using digital circuit elements and/or software in a programmable processor. Further, the receiver may be expected to include a clock recovery module and a threshold adaptation unit to support the operation of the DFE. These are described with reference to other embodiments described below, but may be employed as part of any of the receiver embodiments described herein.

In the embodiment of FIG. 4, the feedback filter 410 must complete its operation in less than one symbol interval because its output depends in part upon the immediately preceding decision. At very high data rates, one symbol interval does not provide sufficient time to finish the filter coefficient multiplications and the feedback subtraction. Accordingly, one solution that has been proposed in the literature is "unrolling" the feedback filter.

Figure 5A:
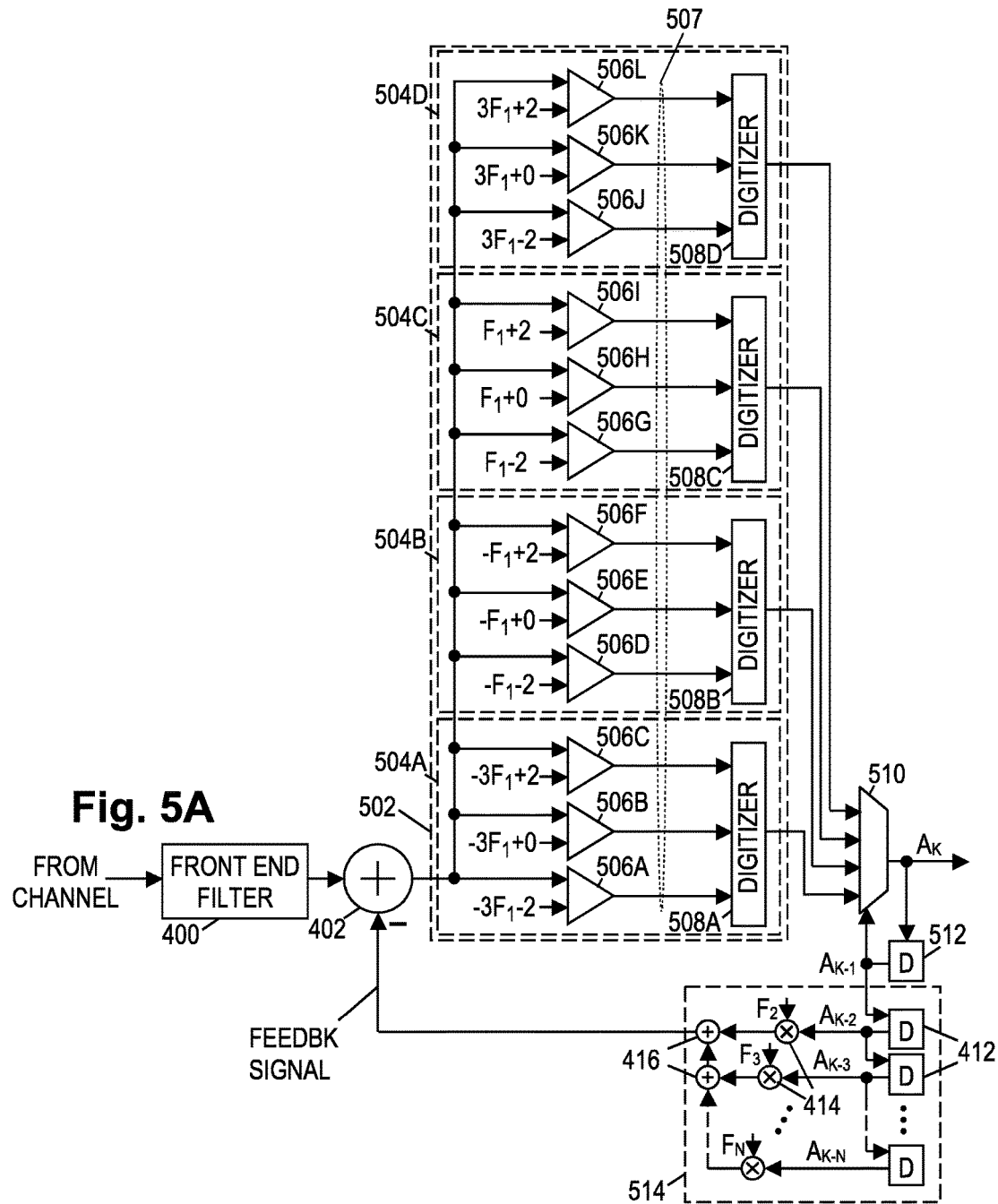
FIG. 5A is a block diagram of an illustrative DFE employing a one-tap precompensation unit.

FIG. 5A shows an illustrative variation of FIG. 4 that unrolls the feedback filter by one tap. The embodiment of FIG. 5A employs the same front end filter 400, but summer 402 subtracts a feedback signal to remove the trailing ISI caused by all but the immediately preceding symbol. For each possible value of the immediately preceding symbol, the precompensation unit 502 provides a tentative decision element 504A-504D. Tentative decision element 504A speculatively assumes that the preceding symbol was −3, and rather than subtracting the ISI that would result from this symbol ($-3*f_1$, where $f_1$ is the coefficient of the first tap in the textbook feedback filter 410), the thresholds of comparators 506A-506C have been adjusted relative to the thresholds of comparators 406A-406C by adding $-3*f_1$, enabling tentative decision element 504A to form a tentative symbol decision based on this speculative assumption.

Similarly, tentative decision elements 504B, 504C, and 504D employ comparators with suitably adjusted thresholds to render tentative decisions under the speculative assumptions that the preceding symbol was −1, +1, and +3, respectively. Thus precompensation unit 502 produces a set of tentative decisions, the set including a tentative decision for each possible value of the preceding symbol. The precompensation unit 502 supplies the set of tentative decisions to a multiplexer 510, which selects one of the tentative decisions as the proper symbol decision $A_k$ based on the immediately preceding symbol decision $A_{k-1}$, which is stored by delay element 512. Feedback filter 514 has a reduced number of taps (filter coefficients), but otherwise operates similarly to feedback filter 410.

Although this unrolling step increases the number of elements in the DFE loop (the loop having summer 402, precompensation unit 502, multiplexer 510, delay element 512, and feedback filter 514), only the elements of the inner loop (the loop consisting of multiplexer 510 and delay element 512) need to achieve their operations in less than one symbol interval. The remaining DFE loop elements can take up to two symbol intervals to complete their pipelined operation. If it is still a challenge to complete the feedback filter operation in time, further unrolling can be performed as shown in FIG. 5B.

Figure 5B:
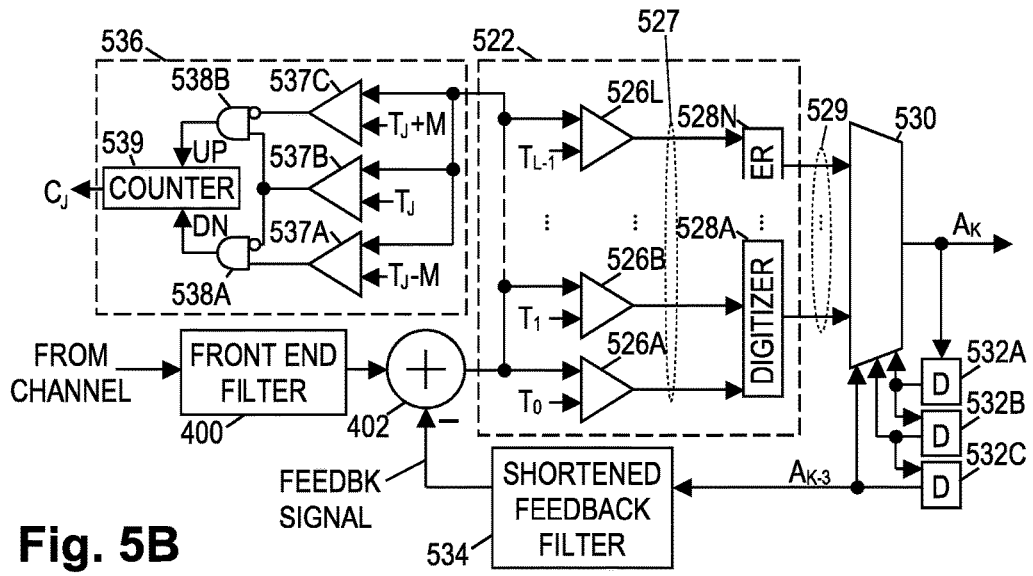
FIG. 5B is a block diagram of an illustrative adaptive DFE having a three-tap precompensation unit.

In the example of FIG. 5B, the feedback filter 534 has been "unrolled" or shortened by 3 taps, so that the feedback signal supplied to the summer 402 compensates for the trailing ISI caused by all except the three immediately preceding symbols. Precompensation unit 522 is expanded to supply a set of tentative decisions corresponding to each possible combination of the three preceding symbols. For a PAM4 system, the set 529 includes $N=4^3=64$ tentative decisions. More generally, if the feedback filter is shortened by P taps and each symbol has Q possible values, the tentative decision set 529 includes $N=Q^P$ tentative decisions. The precompensation unit 522 supplies the tentative decision set 529 to a multiplexer 530, which selects one of the tentative decisions as the proper symbol decision $A_k$ based on the P immediately preceding symbol decisions $A_{(k-1)}$-$A_{(k-P)}$.

Since the current symbol also has Q possible values requiring (Q−1) thresholds to distinguish between them, the precompensation unit 522 may employ up to $L=(Q-1)Q^P$ comparators, each applying a different threshold value $T_0$-$T_{L-1}$, respectively. (However, there may be opportunities to reduce the number of required thresholds and comparators as set forth in co-owned U.S. Pat. No. 9,935,800.) There is a corresponding threshold value $T_i$ for each possible combination of the P preceding symbols. Each tentative decision in the set 529 may be formed (e.g., by the digitizers 528A-528N) from (Q−1) of the comparator outputs 527.

FIG. 5B further shows an optional threshold adapter unit 536 that may be used to modify the precompensator's threshold voltages $T_0$-$T_{(L-1)}$ in response to changing channel conditions. In the illustrated embodiment, the optional threshold adapter unit 536 includes three comparators 537A, 537B, 537C, two logic gates 538A, 538B, and an up/down counter 539. The comparators 537A-537C each receive the input signal to the precompensation unit 522 and a respective threshold value ($T_J$−M), $T_J$, ($T_J$+M), where $T_J$ is a selected one of the precompensator threshold values and M is a margin value selected to create two voltage ranges or "windows", one on each side of the selected precompensator threshold value $T_J$. The comparator 537A compares a voltage level of the sampled input signal to the voltage value ($T_J$−M), producing a logic '0' output when the voltage level of the sampled input signal is less than the voltage value ($T_J$−M), and a logic '1' output when the voltage level of the sampled input signal exceeds the voltage value ($T_J$−M). The comparator 537B similarly receives the sampled input signal and compares it to the threshold value $T_J$, while comparator 537C compares the sampled input signal to the voltage value ($T_J$+M).

The logic gate 538A combines the outputs of comparators 537A, 537B, to assert a down-count signal DN when the sampled input signal is in the window below the selected threshold value. Similarly, logic gate 538B combines the outputs of comparators 537B, 537C to assert an up-count signal UP when the sampled input signal is in the window above the selected threshold value. The up/down counter 539 operates in response to the UP and DN signals to determine over a given time interval, a net count $C_J$. If the net count is positive, this indicates (for zero-mean additive noise) that the selected threshold is too high, and the receiver may lower the selected threshold accordingly, e.g., by one step size, or by an amount proportionate to the count imbalance. If the net count $C_J$ is negative, the selected threshold may be too low and the receiver may raise the selected threshold value accordingly, e.g., by one step size or by an amount proportionate to the net count.

The optional threshold adapter unit 536 may iterate systematically through the threshold values $T_0, T_1, \ldots$, zeroing the counter and determining the net count in a given time interval (e.g., $10^{-4}$s) for each, adjusting the threshold accordingly. The threshold adapter unit 536 may cycle continuously through each of the threshold voltages to provide dynamic channel tracking. In other embodiments, the optional threshold adapter unit employs a set of comparators and a counter for each threshold, enabling the net count for each threshold to be determined in parallel for even faster adaptation. Note that comparator 537B is duplicative of an existing comparator in the precompensator, and thus may be omitted in favor of selecting the appropriate signal in the comparator output set 527.

Figure 6:
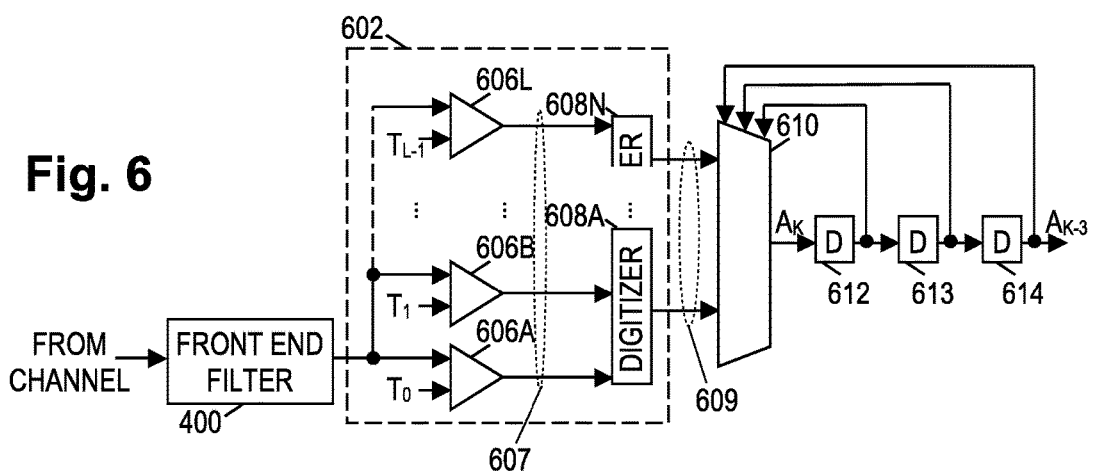
FIG. 6 is a block diagram of an illustrative DFE with a precompensation unit for a fully-unrolled feedback filter.

FIG. 6 shows an illustrative DFE variation in which a 3-tap feedback filter has been completely unrolled and its function completely subsumed by the precompensation unit 602. This embodiment still employs front end filter 400, but the summer 402 is eliminated since the feedback filter no longer exists as a separate element. As before, the precompensation unit 602 employs a set of $$L=(Q-1)Q^P$$

comparators applying a set 607 of L precompensator threshold voltages $T_0$-$T_{(L-1)}$ to form a set 609 of $N=Q^P$ tentative symbol decisions corresponding to each possible combination of P preceding symbols. A large multiplexer 610 selects a proper one of the tentative symbol decisions as the proper symbol decision $A_k$ based on the preceding symbol decisions $A_{(k-1)}$-$A_{(k-P)}$ held in delay elements 612, 613, 614, thereby producing the sequence of symbol decisions $A_k$.

While such unrolling can address timing constraints on the feedback filter, the operating time required by the inner loop (multiplexer 610 and delay element 612) may become the limiting factor at very high data rates. In other words, for any given semiconductor process, the propagation delay of the multiplexer becomes a bottleneck to the loop-unrolling approach as the data rate increases. U.S. Pat. No. 8,301,036 ("High-speed adaptive decision feedback equalizer") and U.S. Pat. No. 9,071,479 ("High-speed parallel decision feedback equalizer") address this issue with parallelization techniques, which are specifically contemplated for use with the disclosed adaptation units and clock recovery modules disclosed herein. To that end, the disclosures of these two patents are hereby incorporated herein in their entirety.

Figure 7:
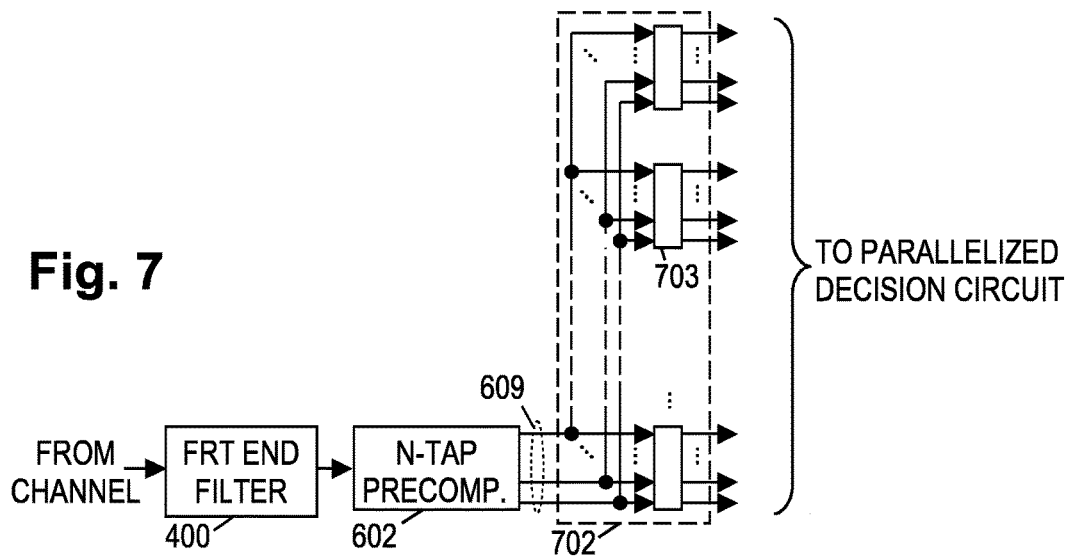
FIG. 7 shows an illustrative DFE front end that produces a parallel array of tentative decision sets.

These parallelization techniques share certain common elements as shown in FIG. 7. The set of tentative decisions 609 provided by the precompensation unit 602 is supplied to a serial-to-parallel converter 702 having a series of registers 703. The registers 703 latch in a round-robin fashion to capture each tentative decision set as it becomes available and to hold it for as long as necessary for subsequent processing by a parallelized decision circuit to select symbol decisions from among the sets of tentative symbol decisions, i.e., up to R symbol intervals where R is the number of registers. Other implementations of serial-to-parallel conversion units are known and can be used. Some implementations provide the captured set of tentative decisions as output upon capture, whereas others may store the captured sets to be output simultaneously as a whole group.

Returning now to the precompensation unit, certain techniques are described to exploit the structure of the precompensation unit to provide enhanced clock recovery with minimal added complexity and power consumption. Taking precompensation unit 502 (FIG. 5A) as an example, the 12 threshold values for $f_0=1$ and $f_1=0.55$ are shown as triangles on a number line in FIG. 8. The comparators collectively divide the numberline into 13 segments, each segment being represented by a quantization value.

Figure 8:
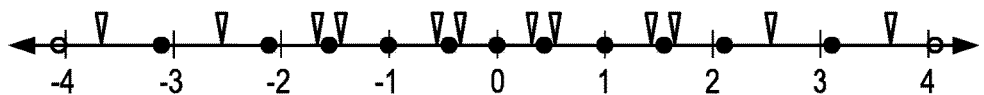
FIG. 8 is a number line showing illustrative pre-compensation threshold values.

FIG. 8 shows the quantization values as circles on the number line. The filled circles are positioned midway between each pair of neighboring threshold values. The open circles are quantization values for the segments below the minimum threshold value and above the maximum threshold value. These circles may be spaced a distance d from the corresponding threshold value, with d being chosen heuristically or chosen to minimize the quantization noise. One suitable heuristic value for d is half the maximum spacing between neighboring thresholds, which in this example is $d=f_1=0.55$. As the number of precompensated feedback filter taps increases, the number of thresholds (and hence quantization values) generally increases. If desired, however, the number of threshold values can be limited, either through modification of the front end filter design, or through approximation. These complexity reduction techniques are described in co-owned patent U.S. Pat. No. 9,935,800.

If ordered by threshold value, the precompensator's comparator results 507, 527, 607, provide a binary, "thermometer"-coded, representation of the quantization value. Stated in another fashion, the comparators collectively function as an uneven quantizer of the filtered receive signal at each sampling instant k. If the comparators are indexed according to the threshold level, e.g., $T=[T_0, T_1, T_2, \ldots, T_{L-1}]$ with $T_i < T_j$ for all combinations of $i<j$, then the first m bits of T are "1" and the remaining bits are "0" when received signal at sampling instant k is between $T_{m-1}$ and $T_m$. The quantized value for the received signal $y_k$ may then be expressed:

$$\hat{y}_k = \begin{cases} \frac{(T_{m-1}+T_m)}{2}, & \text{if } T_{m-1} < y_k < T_m \\ T_0 - d, & \text{if } y_k < T_0 \\ T_{L=1} + d, & \text{if } y_k > T_{L-1} \end{cases}$$

As previously mentioned, d is a preset value which can be tuned to optimize the quantization error. Thus the L comparators sample the filtered receive signal as one of L+1 possible quantized values, which may be nonuniformly spaced.

Figure 9:
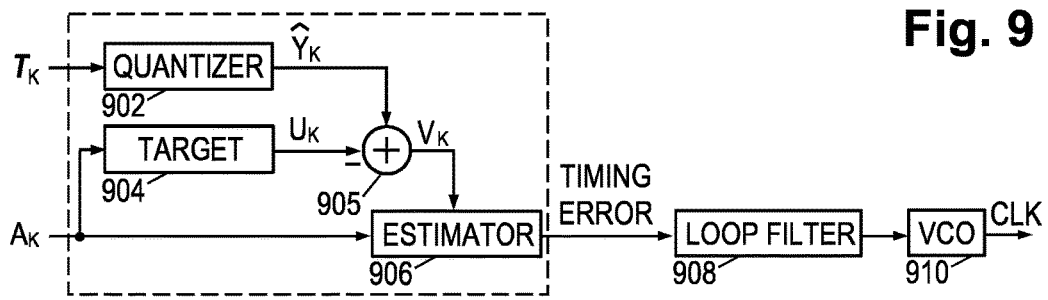
FIG. 9 is a block diagram of an illustrative clock recovery module.

FIG. 9 shows an illustrative clock recovery module that may be implemented as a part of any DFE circuit employing a precompensation unit, including for example the circuits of FIGS. 5A, 5B, 6, and 7. The clock recovery module generates a sampling clock signal "CLK" by combining the sequence of symbol decisions $A_k$ produced by the DFE with the sequence of comparator outputs $T_k$ from the precompensation unit. The clock signal may be supplied to the precompensation unit to specify the sampling instants and drive the baud-rate components downstream of the sample-and-hold element.

The clock recovery module of FIG. 9 includes a quantizer 902 that determines the quantized value for the filtered receive signal $\hat{y}_k$ based on the precompensator's comparator output vector $T_k$. Note that the quantized value may be represented in analog or digital form.

The clock recovery module further includes a targeting element 904 that, based on the sequence of symbol decisions, provides a target value $u_k$ for the receive signal. For PAM4 signaling, the target value may be expressed $$u_k = \sum_{i=0}^{P-1} A_{k-i} f_i,$$

where $A_k \in \{\pm 1, \pm 3\}$, $f_i$ are the trailing ISI coefficients, and P is the number of preceding symbols being accommodated by the precompensation unit. Note that a truncated number of terms p<P can be employed to reduce complexity at the cost of potentially increased clock jitter.

A summer element 905 subtracts the target value $u_k$ from the quantized value $\hat{y}_k$ to obtain a discrepancy value $v_k$. An estimator 906 combines the symbol decisions with the discrepancy values to estimate a timing error. The estimator 906 may employ a Muller-Mueller approach to estimate timing error. One such approach employs the following estimation of timing error $z_k$:

$z_k = A_{k-1} v_k - A_k v_{k-1}$

In an alternative embodiment, the targeting element 904 and summer element 905 are omitted, and the timing error is estimated as:

$z_k = A_{k-1} \hat{y}_k - A_k \hat{y}_{k-1}$

In another alternative embodiment, the summer element 905 is omitted and the estimator 906 combines the output of quantizer 902 with the output of the targeting element 904, reformulating the timing error as:

$z_k = u_{k-1} \hat{y}_k - u_k \hat{y}_{k-1}$

In still other alternative embodiments, the sign (polarity) of the symbol decisions is used in place of the symbol decision itself, e.g.:

$z_k = \text{sign}(A_{k-1}) v_k - \text{sign}(A_k) v_{k-1}$

A loop filter 908 filters the stream of timing error estimates $z_k$ to obtain a control signal for a voltage controlled oscillator (VCO) 910 that produces the sample clock. The control signal represents a filtered timing error estimate, adjusting the frequency of the sampling clock upward or downward as needed to compensate for consistently positive or consistently negative timing error estimates. The resulting sample clock is expected to suffer less clock jitter than other clock recovery solutions which tend to perform poorly in channels having elevated levels of intersymbol interference.

Figure 10:
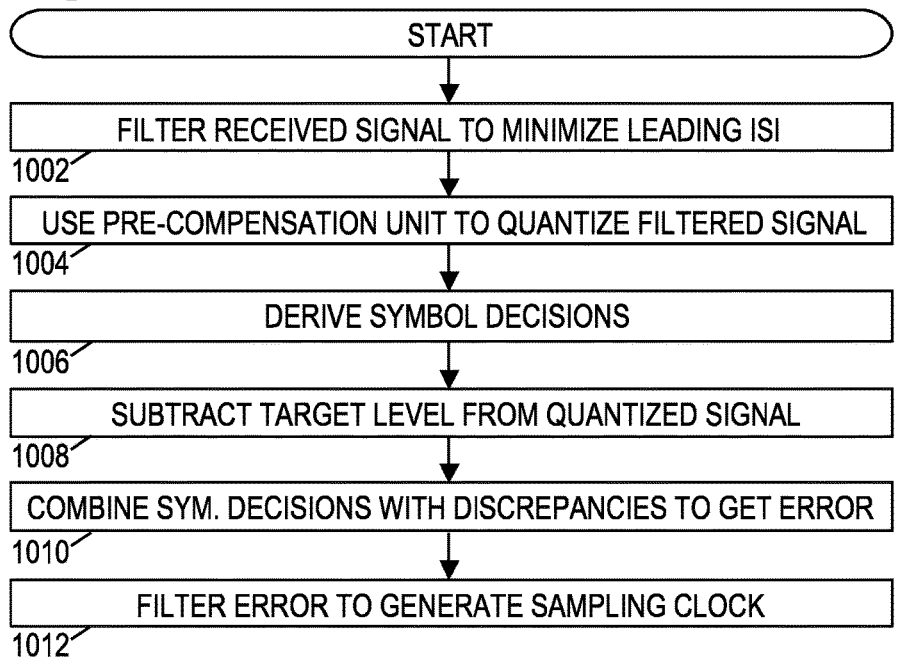
FIG. 10 is a flowchart of an illustrative method for equalizing high speed receiving devices.

FIG. 10 is a flowchart of an illustrative method for providing a high-speed receiving device with DFE-based equalization. It begins in block 1002 with the front end filter filtering a receive signal to minimize, or at least reduce, leading intersymbol interference. In block 1004 a precompensation unit samples the receive signal and generates a set of tentative decisions, in the process also generating a representation of a quantized receive signal value. In block 1006, the decision elements of the DFE select from the tentative symbol decisions to generate a sequence of symbol decisions. In block 1008, a targeting element derives a target value from the sequence of symbol decisions, and the target value is subtracted from the quantized receive signal to obtain a discrepancy for each sampling instant. In block 1010, an estimator combines the discrepancies with the symbol decisions to generate a sequence of timing error estimates. In block 1012, the timing error estimates are filtered and used to generate a sampling clock for use in defining the sampling instants of the receive signal.

Numerous alternative forms, equivalents, and modifications will become apparent to those skilled in the art once the above disclosure is fully appreciated. For example, the symbol set for the receive signal may be bipolar, PAM4, or PAM8. The precompensator may employ a reduced set of thresholds. The outputs of comparators used for threshold adaptation may be combined with those of the precompensation unit to provide even finer quantizations. It is intended that the claims be interpreted to embrace all such alternative forms, equivalents, and modifications that are encompassed in the scope of the appended claims.

What is claimed is:

1. A method of providing high speed equalization, the method comprising:
   obtaining a receive signal having a sequence of symbols from a symbol set, the receive signal having trailing intersymbol interference;
   operating on the receive signal with a precompensation unit having a set of comparators to produce, for each sampling instant, a set of comparator results representing a quantized receive signal value, the set of comparators applying a set of threshold values that at least partly compensate for the trailing intersymbol interference;
   deriving a symbol decision from each set of comparator results;
   combining the symbol decisions with said quantized receive signal values to determine an estimated timing error for each sampling instant; and
   filtering the estimated timing errors to generate a sampling clock.

2. The method of claim 1, wherein said deriving includes using the comparator results to form a set of tentative decisions for each sampling instant and, based on one or more symbol decisions preceding that sampling instant, selecting a symbol decision from the set of tentative decisions.

3. The method of claim 1, wherein the set of threshold values is nonuniformly spaced and yields a nonuniformly spaced set of possible values for the quantized receive signal.

4. The method of claim 3, wherein the set of possible values includes values midway between each pair of neighboring threshold values, and further includes a maximum value greater than the maximum threshold value by a given amount and a minimum value less than the minimum threshold value by the given amount.

5. The method of claim 4, wherein the given amount minimizes expected quantization error.

6. The method of claim 4, further comprising adapting the threshold values based to improve compensation of the trailing intersymbol interference.

7. The method of claim 3, wherein the symbol set includes more than two symbols.

8. The method of claim 3, wherein said combining includes:
   scaling a quantized receive signal value for a given sampling instant by a polarity or signed value of a symbol decision for a preceding sampling instant to obtain a first term;
   scaling a quantized receive signal value for the preceding sampling instant by a polarity or signed value of a symbol decision for the given sampling instant to obtain a second term; and
   taking a difference between the first and second terms as the estimated timing error for the given sampling instant.

9. The method of claim 3, wherein the combining includes:
   determining a target signal level for a given sampling instant based at least in part on a symbol decision for the given instant; and
   taking a difference between the target signal level and a quantized receive signal value for the given sampling instant to obtain a discrepancy for the given instant.

10. The method of claim 9, wherein the combining further includes:
    scaling the discrepancy for the given sampling instant by a polarity or signed value of a symbol decision for a preceding sampling instant to obtain a first term;
    scaling a discrepancy for the preceding sampling instant by a polarity or signed value of a symbol decision for the given sampling instant to obtain a second term; and
    taking a difference between the first and second terms as the estimated timing error for the given sampling instant.

11. A channel interface module that comprises a receiver having:
    a front end filter that produces a filtered receive signal having a sequence of symbols from a symbol set, the filtered receive signal having trailing intersymbol interference;
    a precompensation unit that operates on the filtered receive signal with a set of comparators applying a set of threshold values that at least partly compensate for the trailing intersymbol interference, the set of comparators producing, for each sampling instant, a set of comparator results representing a quantized receive signal value;
    one or more selection elements that derive a symbol decision from each set of comparator results;
    a clock recovery module that combines the symbol decisions with said quantized receive signal values to generate a sampling clock.

12. The module of claim 11, wherein the comparator results are organized as a set of tentative decisions for each sampling instant, and wherein each of the one or more selection elements selects a symbol decision from a corresponding set of tentative decisions.

13. The module of claim 11, wherein the set of threshold values is nonuniformly spaced and yields a nonuniformly spaced set of possible values for the quantized receive signal.

14. The module of claim 13, wherein the set of possible values includes values midway between each pair of neighboring threshold values, and further includes a maximum value greater than the maximum threshold value by a given amount and a minimum value less than the minimum threshold value by the given amount.

15. The module of claim 14, wherein the given amount minimizes expected quantization error.

16. The module of claim 14, further comprising adaptation units that adapt the threshold values based to improve compensation of the trailing intersymbol interference.

17. The module of claim 13, wherein said clock recovery module includes:
- a first scaler that scales a quantized receive signal value for a given sampling instant by a polarity or signed value of a symbol decision for a preceding sampling instant to obtain a first term;
- a second scaler that scales a quantized receive signal value for the preceding sampling instant by a polarity or signed value of a symbol decision for the given sampling instant to obtain a second term; and
- a combiner that determines a difference between the first and second terms and produces the difference as the estimated timing error for the given sampling instant.

18. The module of claim 13, wherein said clock recovery module includes:
- a targeting element that produces a target signal level for a given sampling instant based at least in part on a symbol decision for the given instant; and
- a first combiner that takes a difference between the target signal level and a quantized receive signal value for the given sampling instant to obtain a discrepancy for the given instant.

19. The module of claim 18, wherein the clock recovery module further includes:
- a first scaler that scales the discrepancy for the given sampling instant by a polarity or signed value of a symbol decision for a preceding sampling instant to obtain a first term;
- a second scaler that scales the discrepancy for the preceding sampling instant by a polarity or signed value of a symbol decision for the given sampling instant to obtain a second term; and
- a second combiner that determines a difference between the first and second terms and produces the difference as the estimated timing error for the given sampling instant.

20. The module of claim 19, wherein the clock recovery module further includes:
- a filter that filters the estimated timing errors to produce a control signal; and
- a voltage controlled oscillator that produces the sampling clock in response to the control signal.

21. The module of claim 13, wherein said clock recovery module includes:
- a targeting element that produces a target signal level for a given sampling instant based at least in part on a symbol decision for the given instant;
- a first scaler that scales the quantized receive signal value for the given sampling instant by a polarity or signed value of a target signal level for a preceding sampling instant to obtain a first term;
- a second scaler that scales the quantized receive signal value for the preceding sampling instant by a polarity or signed value of a target signal level for the given sampling instant to obtain a second term; and
- a combiner that determines a difference between the first and second terms and produces the difference as the estimated timing error for the given sampling instant.

* * * * *